United States Patent [19]

Furumoto et al.

[11] Patent Number: 4,922,715
[45] Date of Patent: May 8, 1990

[54] HYDRAULICALLY OPERATED CONTINUOUSLY VARIABLE TRANSMISSION

[75] Inventors: Mitsumasa Furumoto; Eiichiro Kawahara, both of Saitama; Takashi Koyama, Tokyo, all of Japan

[73] Assignee: Honda Giken Kogyo Kabushiki Kaisha, Tokyo, Japan

[21] Appl. No.: 130,791

[22] Filed: Dec. 9, 1987

[30] Foreign Application Priority Data

Dec. 9, 1986 [JP] Japan ................................. 61-293072

[51] Int. Cl.$^5$ ............................................. F16D 31/00
[52] U.S. Cl. ........................................ 60/329; 60/468; 60/487; 60/488
[58] Field of Search .................. 60/487-492, 60/329, 459, 468, 455, 464; 91/501; 417/299, 306, 309

[56] References Cited

U.S. PATENT DOCUMENTS

| | | |
|---|---|---|
| 2,617,360 | 11/1952 | Barker ........................... 91/501 X |
| 2,777,286 | 1/1957 | Badalini . |
| 3,295,459 | 1/1967 | Griffith . |
| 3,364,679 | 1/1968 | Osojnak . |
| 3,522,999 | 8/1970 | Liles ............................ 417/299 X |
| 3,704,588 | 12/1972 | Trabbic ....................... 417/299 X |
| 4,158,290 | 6/1979 | Cornell ............................ 60/445 |
| 4,170,153 | 10/1979 | Mizuno ........................... 74/868 |
| 4,253,347 | 3/1981 | Mizuno ........................... 74/862 |
| 4,261,229 | 4/1981 | Mizuno ........................... 74/866 |
| 4,444,093 | 4/1984 | Koga .............................. 91/488 |
| 4,478,134 | 10/1984 | Kawahara et al. ................ 91/488 |
| 4,646,520 | 3/1987 | Furumoto . |
| 4,699,571 | 10/1987 | Bartholomaus .................. 417/213 |

FOREIGN PATENT DOCUMENTS

| | | |
|---|---|---|
| 1951234 | 4/1971 | Fed. Rep. of Germany . |
| 41-3208 | 3/1966 | Japan . |
| 54-141948 | 11/1979 | Japan . |
| 55-1290 | 1/1980 | Japan . |
| 56-143857 | 9/1981 | Japan . |
| 57-70968 | 5/1982 | Japan . |
| 57-76357 | 5/1982 | Japan . |
| 57-163704 | 10/1982 | Japan . |
| 59-44535 | 10/1984 | Japan . |
| 902978 | 8/1962 | United Kingdom . |

Primary Examiner—Edward K. Look
Attorney, Agent, or Firm—Lyon & Lyon

[57] ABSTRACT

A hydraulically operated continuously variable transmission includes a hydraulic pump coupled to an input shaft, a hydraulic motor coupled to an output shaft, a closed hydraulic circuit interconnecting the hydraulic pump and the hydraulic motor, and a control valve coupled to an inlet of the hydraulic pump and openable for discharging working oil from the hydraulic pump when the pressure of oil in the inlet of the hydraulic pump is below a prescribed pressure level. The transmission also includes a hydraulically hermetic chamber defined between the pump and motor cylinders and accommodating therein the pump swash plate and the pump plungers, and oil discharge means disposed in the motor cylinder for discharging oil from the hydraulically hermetic chamber when the pressure of oil in the hydraulically hermetic chamber is below a prescribed pressure level.

23 Claims, 4 Drawing Sheets

HYDRAULICALLY OPERATED CONTINUOUSLY VARIABLE TRANSMISSION

BACKGROUND OF THE INVENTION

The present invention relates to a hydraulically operated continuously variable transmission having a hydraulic pump coupled to an input shaft and a hydraulic motor coupled to an output shaft, the hydraulic pump and the hydraulic motor being interconnected by a closed hydraulic circuit.

Hydraulically operated continuously variable transmissions are known in the art as disclosed in Japanese Laid-Open Patent Publication Nos. 57-76357 and 56-143857, for example.

In such hydraulically operated continuously variable transmissions, even when the inlet and outlet ports of a hydraulic pump are coupled to each other by a clutch valve, the hydraulic pump draws and discharges working oil in response to rotation of an input shaft. When the viscosity of the working oil is higher at low temperature than it is at normal temperature, the instantaneous load produced by the oil drawing and discharging action of the hydraulic pump upon rotation of the input shaft driven by an engine is large regardless of the clutch valve being actuated to interconnect the inlet and outlet ports of the hydraulic pump. Therefore, the engine cannot be started smoothly by relatively small initial power of a starter or the like.

In addition, since in a hydraulically hermetic chamber is filled with oil during engine shutdown, when the engine is started, resistance is produced by the plungers of the hydraulic pump which operate in and stirs the oil in the hydraulically hermetic chamber Therefore, the engine cannot be started smoothly by the starter. The resistance generated by the pump plungers when starting the engine is large at low temperature since the viscosity of the oil is high.

SUMMARY OF THE INVENTION

In view of the aforesaid drawback of conventional hydraulically operated continuously variable transmissions, it is an object of the present invention to provide a hydraulically operated continuously variable transmission which employs a conventional closed hydraulic circuit, but is capable of reducing the load produced by the transmission when an input shaft operates at an initial stage.

Another object of the present invention is to provide a hydraulically operated continuously variable transmission which imposes a reduced load when starting an engine by lowering resistance which would be produced by stirring oil at the time of starting an input shaft.

According to the present invention, there is provided a hydraulically operated continuously variable transmission comprising an input shaft, a hydraulic pump coupled to the input shaft and having a pump swash plate and a pump cylinder supporting an annular array of slidable pump plungers held in slidable contact with the pump swash plate, an output shaft, a hydraulic motor coupled to the output shaft and having a motor swash plate and a motor cylinder supporting an annular array of slidable motor plungers held in slidable contact with the motor swash plate, a closed hydraulic circuit interconnecting the hydraulic pump and the hydraulic motor, and control valve means coupled to an inlet of the hydraulic pump and openable for discharging working oil from the hydraulic pump when the pressure of oil in the inlet of the hydraulic pump is below a prescribed pressure level.

According to the present invention, there is also provided a hydraulically operated continuously variable transmission comprising an input shaft, a hydraulic pump coupled to the input shaft and having a pump swash plate and a pump cylinder supporting an annular array of slidable pump plungers held in slidable contact with the pump swash plate, an output shaft, a hydraulic motor coupled to the output shaft and having a motor swash plate and a motor cylinder supporting an annular array of slidable motor plungers held in slidable contact with the motor swash plate, the pump cylinder being surrounded by the motor cylinder with a hydraulically hermetic chamber defined therebetween and accommodating therein the pump swash plate and the pump plungers, a closed hydraulic circuit interconnecting the hydraulic pump and the hydraulic motor, and oil discharge means disposed in the motor cylinder for discharging oil from the hydraulically hermetic chamber when the pressure of oil in the hydraulically hermetic chamber is below a prescribed pressure level.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
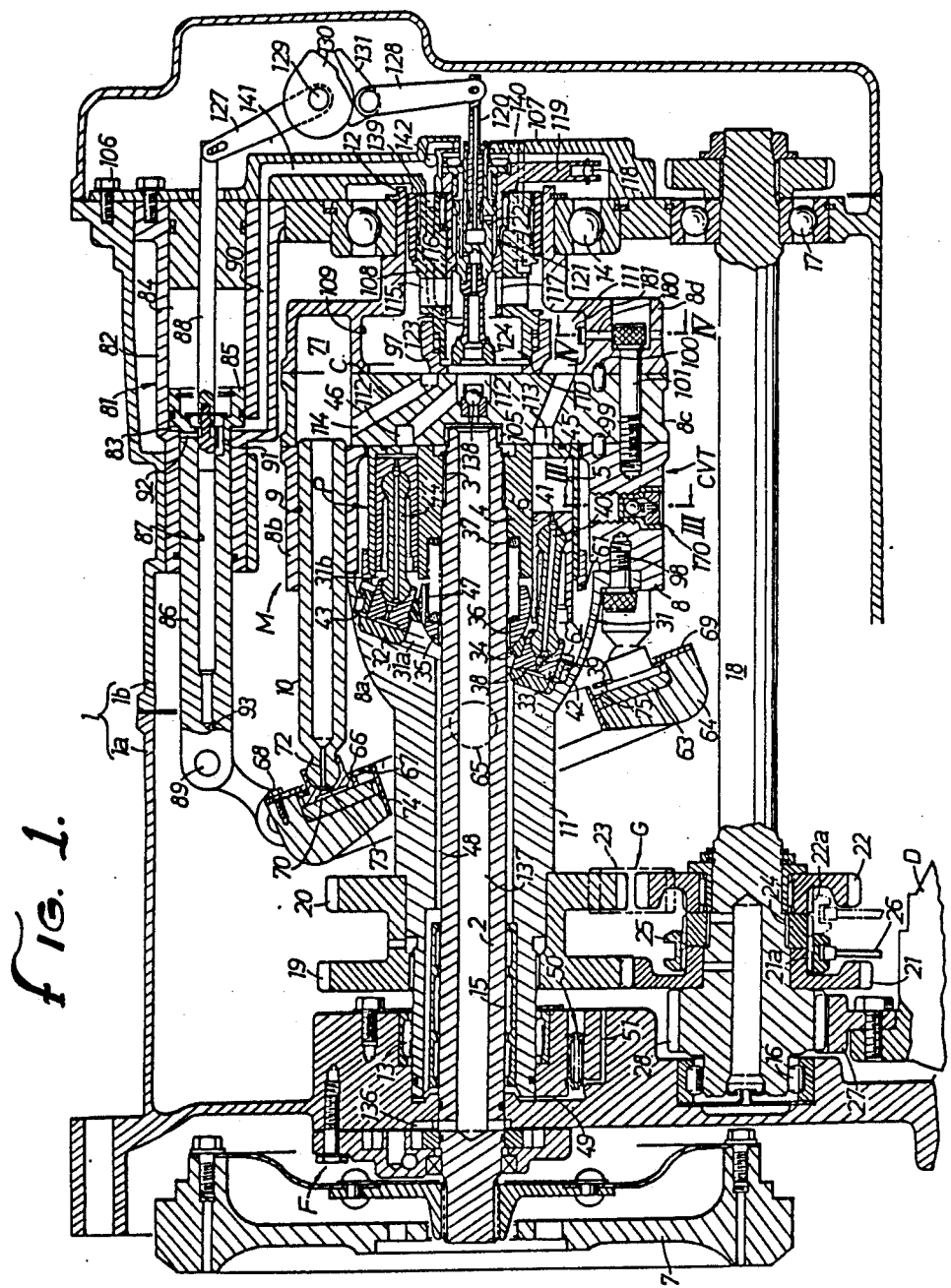
FIG. 1 is a longitudinal cross-sectional view of an automotive hydraulically operated continuously variable transmission according to the present invention.

Like or corresponding parts are denoted by like or corresponding reference numerals throughout the several views.

FIG. 1 shows a hydraulically operated continuously variable transmission CVT according to the present invention for use on a motor vehicle such as an automobile, the transmission CVT basically comprising a hydraulic pump P of the fixed displacement type coupled to an input shaft 2 driven by an engine (not shown) and a hydraulic motor M of the variable displacement type disposed coaxially with the hydraulic pump. The hydraulic pump P and the hydraulic motor M are coupled to each other in a closed hydraulic circuit C. The hydraulic motor M is operatively coupled to wheels (not shown) through an output shaft 11, a forward/reverse gear assembly G, an auxiliary shaft 18, and a differential D. The continuously variable transmission CVT is housed in a transmission case 1 composed of a pair of longitudinally separate case members 1a, 1b coupled together.

The hydraulic pump P has a pump cylinder 4 splined at 3 to an input shaft 2, a plurality of cylinder holes or bores 5 defined in the pump cylinder 4 in a circular pattern around the input shaft 2, and a plurality of pump plungers 6 slidably fitted respectively in the cylinder holes 5. The power of the engine is transmitted through a flywheel 7 to the input shaft 2.

The hydraulic motor M has a motor cylinder 8 disposed concentrically in surrounding relation to the pump cylinder 4 and rotatable relatively thereto, a plurality of cylinder holes or bores 9 defined in the motor cylinder 8 in a circular pattern around the center of rotation thereof, and a plurality of motor plungers 10 slidably fitted respectively in the cylinder holes 9.

The motor cylinder 8 has axially opposite ends on which output and support shafts 11, 12 are coaxially mounted, respectively. The output shaft 11 is rotatably supported on the axial end wall of the case member 1a by means of a needle bearing 13, and the support shaft 12 is rotatably supported on the axial end wall of the case member 1b by means of a ball bearing 14.

The input shaft 2 extends through the end wall of the case member 1a in a fluid-tight manner, and is disposed concentrically in the output shaft 11. A plurality of needle bearings 15 are disposed between the inner surface of the output shaft 11 and the outer surface of the input shaft 2, so that the input shaft 2 and the pump cylinder 4, and the output shaft 11 and the motor cylinder 8 are relatively rotatable.

Parallel to the output shaft 11, the auxiliary shaft 18 is rotatably supported on the opposite end walls of the transmission case 1 by a roller bearing 16 and a ball bearing 17. The forward/reverse gear assembly G is located between the auxiliary shaft 18 and the output shaft 11.

The forward/reverse gear assembly G comprises a pair of driver gears 19, 20 fixedly mounted on the output shaft 11, a driven gear 21 rotatably supported on the auxiliary shaft 18 in mesh with the driver gear 19, a driven gear 22 rotatably supported on the auxiliary shaft 18 in radial alignment with the other driver gear 20, an intermediate gear 23 meshing with the driver gear 20 and the driven gear 22, a driven clutch gear 24 fixed to the auxiliary shaft 18 between driver clutch gears 21a, 22a integral with the opposite surfaces of the driven gears 21, 22, and a clutch member 25 for selectively coupling the driver clutch gears 21a, 22a to the driven clutch gear 24. A shift fork 26 engages in the clutch member 25 for selectively moving the same axially into engagement with the driver clutch gear 21a and the driven clutch gear 24 or the driver clutch gear 22a and the driven clutch gear 24.

The auxiliary shaft 18 has an integral gear 28 held in mesh with an input gear 27 of the differential D. In response to operation of the clutch member 25, the differential D is operated selectively in forward and reverse directions of the motor vehicle.

Figure 2:
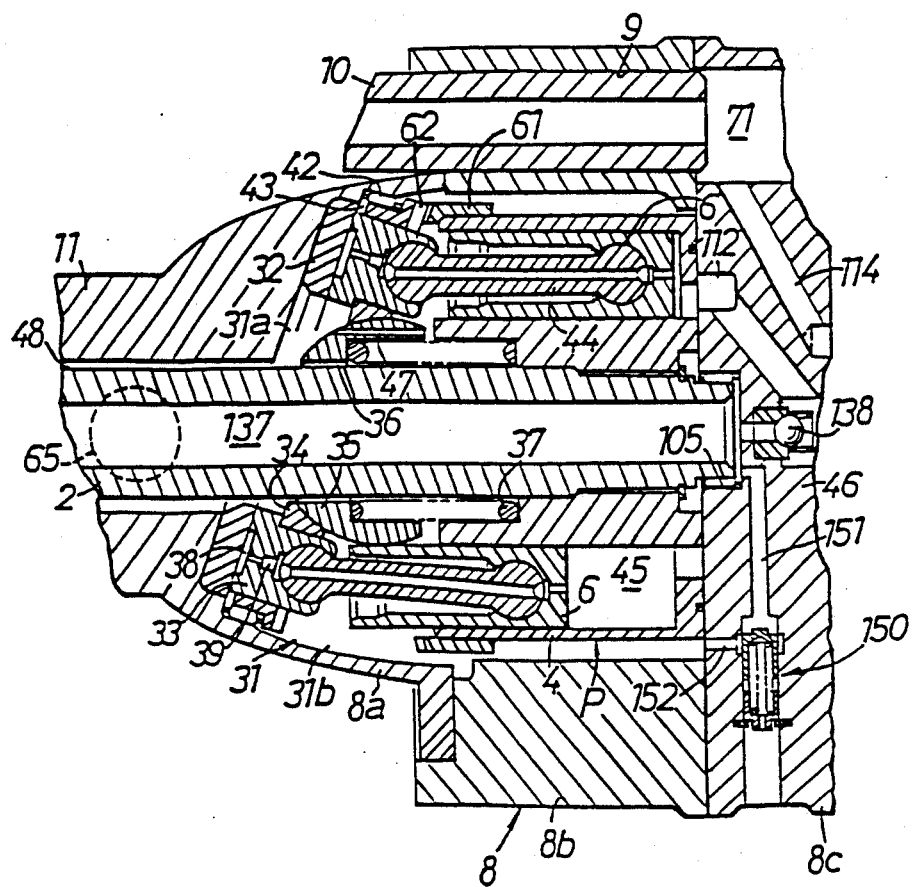
FIG. 2 is an enlarged fragmentary cross-sectional view of the hydraulically operated continuously variable transmission shown in FIG. 1.

As shown in FIG. 2, a hydraulically hermetic chamber 31 is defined between the motor cylinder 8 and the pump cylinder 4, and a pump swash plate 32 is supported in the chamber 31 inwardly of the motor cylinder 8 in facing relation to the end face of the pump cylinder 4. An annular unitary pump shoe 33 is held in slidable contact with the pump swash plate 32.

The pump plungers 6 and the pump shoe 33 are relatively swingably coupled by connecting rods 44. A presser ring 34 supported on the motor cylinder 8 by a roller bearing 42 is held against an inner peripheral step of the pump shoe 33. A spring holder 35 is held against the presser ring 34, the spring holder 35 being coupled to the input shaft 2 through splines 36 which allow axial movement of the spring holder 35 on the input shaft 2 but prevent rotation of the spring holder 35 relatively to the input shaft 2. A coil spring 37 is disposed around the input shaft 2 between the spring holder 35 and the pump cylinder 4 for normally pressing the spring holder 35 to cause the presser ring 34 to push the pump shoe 33 resiliently toward the pump swash plate 32. The spring holder 35 has a partly spherical surface contacting a complementary partly spherical surface of the presser ring 34. Therefore, the spring holder 35 is neatly held against the presser ring 34 for transmitting the resilient force from the spring 37 to the presser ring 34.

The chamber 31 is divided into a first chamber 31a near the pump swash plate 32 and a second chamber 31b near the pump cylinder 4 by the pump shoe 33, the presser ring 34, and the spring holder 35.

The pump swash plate 32 and the pump shoe 33 have mutually sliding surfaces with their inner peripheral edges facing into the first chamber 31a, so that lubricating oil leaking from between these sliding surfaces flow into the first chamber 31a. To lubricate the sliding surfaces of the pump swash plate 32 and the pump shoe 33, an annular hydraulic pocket 38 is defined in the front surface of the pump shoe 33 and communicates through oil holes 39, 30, 41 defined in the pump shoe 33, the connecting rods 44, and the pump plungers 6 with pump chambers 45 defined between the pump plungers 6 and the pump cylinder 4. Therefore, oil under pressure in the pump chambers 45 is supplied through the oil holes 41, 40, 39 to the hydraulic pocket 38 for thereby lubricating the sliding surfaces of the pump shoe 33 and the pump swash plate 32. At the same time, oil pressure in the hydraulic pocket 38 is applied to the pump shoe 33 to bear the projecting thrust of the pump plungers 6, so that the pressure of contact between the pump shoe 33 and the pump swash plate 32 can be reduced.

An annular lubricating chamber 43 is defined around the sliding surfaces of the pump swash plate 32 and the pump shoe 33 by means of the motor cylinder 8, the pump swash plate 32, the pump shoe 33, and a roller bearing 42, the lubricating chamber 43 being part of the second chamber 31b.

Oil under pressure in the hydraulic pocket 38 leaks along the sliding surfaces of the pump shoe 33 and the pump swash plate 32 into the lubricating chamber 43 at all times. The oil that has thus leaked first fills the lubricating chamber 43 as lubricating oil, and then leaks into the second chamber 31b through the roller bearing 42. Therefore, the lubricating chamber 43 is always replenished with new lubricating oil which can reliably lubricate the sliding surfaces of the pump shoe 33 and the pump swash plate 32 even from outside of the pump shoe 33.

Into the second chamber 31b, oil flow from the lubricating chamber 43 and also lubricating oil from the sliding surfaces of the pump plungers 6 and the cylinder holes 5 and the sliding surfaces of the pump cylinder 4 and a distribution member 46.

The spring holder 35 has a passage 47 by which the first and second chambers 31a, 31b are held in communication with each other. Between the output shaft 11 and the input shaft 2, there is defined a first discharge passage 48 communicating with the first chamber 31a and coupled through a second discharge passage 49, a pressure control valve 50, and a third discharge passage 51 to an oil tank (not shown) on the bottom of the transmission case 1.

When the oil pressure in the chamber 31 exceeds a preset pressure level, the pressure control valve 50 is opened to adjust the oil pressure in the chamber 31 to a given pressure level.

Intermeshing bevel gears 61, 62 are fixed respectively to the confronting ends of the pump cylinder 4 and the pump shoe 33. The bevel gears 61, 62 are synchronous gears having the same number of teeth. When the pump cylinder 4 is rotated by the input shaft 2, the pump shoe 33 is synchronously rotated through the bevel gears 61, 62. On rotation of the pump shoe 33, those pump plungers 6 which run along an ascending side of the inclined surface of the pump swash plate 32 are moved in a discharge stroke by the pump swash plate 32, the pump shoe 33, and the connecting rods 44, and those pump plungers 6 which travel along a descending side of the inclined surface of the pump swash plate 32 are moved in a suction stroke.

In the hydraulic motor M, an annular motor swash plate 63 confronting the motor cylinder 8 is fitted in an annular swash plate holder 64. The swash plate holder 64 has a pair of integral trunnions 65 projecting outwardly from its opposite sides and pivotally supported in the transmission case 1. Therefore, the motor swash plate 63 can be tilted together with the swash plate holder 64 about the axis of the trunnions 65.

The tip ends of the respective motor plungers 10 are relatively swingably coupled to a plurality of motor shoes 66 held in slidable contact with the motor swash plate 63. To keep the respective motor shoes 66 in slidable contact with the motor swash plate 63, a presser plate 67 which holds the backs of the motor shoes 66 is rotatably supported by a ring 69 fastened to the swash plate holder 64 by means of bolts 68. The motor shoes 66 and the motor plungers 10 where they are coupled project through the presser plate 67 at a plurality of circumferentially spaced positions The presser plate 67 is therefore rotatable with the motor shoes 66.

Each of the motor shoes 66 has a hydraulic pocket 70 defined in its front face slidably contacting the motor swash plate 63. Oil chambers 71 defined between the closed ends of the cylinder holes 9 and the respective motor plungers 10 communicate with the corresponding hydraulic pockets 70 through joined oil holes 72, 73 defined in the motor plungers 10 and the motor shoes 66. Therefore, oil under pressure in the oil chambers 71 is supplied through the oil holes 72, 73 into the hydraulic pockets 70 to apply a pressure to the motor shoes 66 for bearing the projecting thrust of the motor plungers 10. The pressure thus applied to the motor shoes 66 reduces the pressure of contact between the motor shoes 66 and the motor swash plate 63, and causes oil to lubricate the sliding surfaces of the motor shoes 66 and the motor swash plate 63.

A cylindrical partition 74 is fitted against the inner peripheral surface of the swash plate holder 64 in confronting relation to the inner peripheral surface of the presser plate 67 with a small gap therebetween. The partition 74, the swash plate holder 64, and the presser plate 67 jointly define a lubricating chamber 75 accommodating the sliding surfaces of the motor shoes 66 and the motor swash plate 63.

Oil under pressure in the respective hydraulic pockets 70 leaks along the sliding surfaces of the motor shoes 66 and the motor swash plate 63 at all times. The oil that has thus leaked first fills the lubricating chamber 75 as lubricating oil, and then leaks out through the gap around the presser plate 67. Therefore, the lubricating chamber 75 is always replenished with new lubricating oil which can reliably lubricate the sliding surfaces of the motor shoes 66 and the motor swash plate 63 even from outside of the motor shoes 66.

If the pressure in the lubricating chamber 75 approaches the pressure in the hydraulic pockets 70, the ability of the hydraulic pockets 70 to hydraulically support the motor shoes 66 would be impaired. To prevent this, the gap around the presser plate 67 is suitably selected dependent on the amount of oil leakage from the hydraulic pockets 70 so that the lubricating chamber 75 will hold oil under an approximately atmospheric pressure condition.

A servomotor 81 for tilting the swash plate holder 64, i.e., the motor swash plate 63, is disposed in the transmission case 1. The servomotor 81 comprises a servo cylinder 82 fixed to the transmission case 1, a servo piston 85 slidably disposed in the servo cylinder 82 and dividing the interior space of the servo cylinder 82 into a lefthand oil chamber 83 and a righthand oil chamber 84, a piston rod 86 integral with the servo piston 85 and movably extending through the end wall of the servo cylinder 82 near the lefthand oil chamber 83 in a fluid-tight manner, and a pilot valve 88 having an end slidably fitted in a valve hole 87 defined in the servo piston 85 and the piston rod 86 and movably extending through the end of the servo cylinder 82 near the righthand oil chamber 84 in a fluid-tight manner.

The piston rod 86 is coupled to the swash plate holder 64 by a pin 89. An oil passage 90 defined in the servo cylinder 82 is held in communication with the lefthand oil chamber 83 for supplying oil pressure to act on the servo piston 85. The servo piston 85 and the piston rod 86 have a passage 91 for bringing the righthand oil chamber 84 into communication with the valve hole 87 in response to rightward movement of the pilot valve 88, and a passage 92 for bringing the righthand oil chamber 84 into communication with the lefthand oil chamber 83 in response to leftward movement of the pilot valve 88. The valve hole 87 communicates with the oil tank at the bottom of the transmission case 1 through a return passage 93.

The servo piston 85 is operated in amplified movement by following the lefthand and righthand movement of the pilot valve 88 under the oil pressure from the oil passage 90. In response to movement of the servo piston 85, the swash plate holder 64, i.e., the motor swash plate 63, can be angularly shifted or adjusted between the most inclined position (as shown) and the right-angle position where the motor swash plate 63 lies perpendicular to the motor plungers 10. Upon rotation of the motor cylinder 8, the motor swash plate 63 reciprocally moves the motor plungers 10 into and out of the cylinder holes 9. The stroke of the motor plungers 10 can continuously be adjusted by the inclination of the motor swash plate 63.

The closed hydraulic circuit C is formed between the hydraulic pump P and the hydraulic motor M through the distribution member 46 and a distribution ring 97. When the pump cylinder 4 is rotated by the input shaft 2, high-pressure working oil discharged from the pump chambers 45 accommodating therein the pump plungers 6 in the discharge stroke flows into the oil chambers 71 of the cylinder holes 9 accommodating therein the motor plungers 10 which are in the expansion stroke. Working oil discharged from the oil chambers 71 accommodating therein the motor plungers 10 in the compression stroke flows back into the pump chambers 45 accommodating therein the pump plungers 6 in the suction stroke. During this time, the motor cylinder 8, i.e., the output shaft 11, is rotated by the sum of the reactive torque applied by the motor plungers 10 in the discharge stroke to the motor cylinder 8 through the motor swash plate 63 and the reactive torque received by the motor plungers 10 in the expansion stroke from the motor swash plate 63.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} = \frac{1}{1 + \frac{\text{Displacement of hydraulic motor } M}{\text{Displacement of hydraulic pump } P}}$$

It can be understood from the above equation that the transmission ratio can be varied from 1 to a desired value by varying the displacement of the hydraulic motor M that is determined by the stroke of the motor plungers 10, from zero to a certain value.

The motor cylinder 8 comprises axially separate first through fourth members or segments 8a through 8d. The first member 8a includes the output shaft 11 as a unitary element, and accommodates the pump swash plate 32 therein. The cylinder holes 9 are defined in the second, third, and fourth members 8b through 8d. The third member 8c serves as the distribution member 46. The fourth member 8d has the support shaft 12 as a unitary element.

The first and second members 8a, 8b are coupled to each other by means of a plurality of bolts 98. The second, third, and fourth members 8b, 8c, 8d are relatively positioned by knock pins 99, 100 fitted in positioning holes defined in their mating end faces, and are firmly coupled together by means of a plurality of bolts 101.

The input shaft 2 has an inner end portion rotatably supported centrally in the distribution member 46 by a needle bearing 105. The pump cylinder 4 is resiliently held against the distribution member 46 by the spring 37.

A support plate 107 is fixed to an outer end surface of the case member 1b by means of bolts 106. To the support plate 107, there is securely coupled a cylindrical fixed shaft 108 projecting into the support shaft 12 of the motor cylinder 8. The distribution ring 97 slidably held against the distribution member 46 is eccentrically supported on the inner end of the fixed shaft 108. The distribution ring 97 divides an interior space 109 in the fourth member 8d of the motor cylinder 8 into an inner chamber 110 and an outer chamber 111. The distribution member 46 has an outlet port 112 and an inlet port 113. The outlet port 112 provides fluid communication between the pump chambers 45 that receive the pump plungers 6 operating in the discharge stroke and the inner chamber 110. The inlet port 113 provides fluid communication between the pump chambers 45 that receive the pump plungers 6 operating in the suction stroke and the outer chamber 111. The distribution member 46 also has a number of communication ports 114 defined therein and through which the oil chambers 71 of the motor cylinder 8 communicate with the inner chamber 110 or the outer chamber 111.

Therefore, upon rotation of the pump cylinder 4, high-pressure working oil discharged by the pump plungers 6 in the discharge stroke flows from the outlet port 112 via the inner chamber 110, and those communication ports 114 which communicate with the inner chamber 110 into the oil chambers 71 receiving the motor plungers 10 which are in the expansion stroke, thereby imposing a thrust on these motor plungers 10 Working oil discharged by the motor plungers 10 operating in the compression stroke flows through those communication ports 114 which communicate with the outer chamber 111 and the inlet port 113 into the pump chambers 45 receiving the pump plungers 6 in the suction stroke Upon such circulation of the working oil, hydraulic power can be transmitted from the hydraulic pump P to the hydraulic motor M as described above.

The fixed shaft 108 has a peripheral wall having two, for example, radial bypass ports 115 through which the inner and outer chambers 110, 111 communicate with each other. A clutch valve 116 in the form of a cylindrical clutch valve is rotatably fitted in the fixed shaft 108 for selectively opening and closing the ports 115. The clutch valve 116 has valve holes 117 defined in its peripheral wall near the distal end thereof, and a control connector 119 on the opposite end to which a control shaft 118 coupled to a clutch control device (not shown) is connected. The clutch valve 116 serves as a clutch for selectively connecting and disconnecting the hydraulic pump P and the hydraulic motor M.

When the clutch valve 116 is rotated about its own axis to fully open the valve holes 117 in full registry with the bypass ports 115, the clutch is in an "OFF" position. When the bypass ports 115 are fully closed by shifting the valve holes 117 out of registry therewith, the clutch is in an "ON" position. When the bypass ports 115 are partly opened by slightly shifting the valve holes 117, the clutch is in a "partly ON" (partly engaged) position. With the clutch OFF as shown, working oil discharged from the outlet port 112 into the inner chamber 110 flows through the bypass ports 115 and the outer chamber 111 directly into the inlet port 113, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

The clutch valve 116 houses therein a hydraulic servomotor 121 actuatable by a pilot valve 120. The servomotor 121 has a servo piston 122 including a valve rod 123 which is of a diameter smaller than the inside diameter of the clutch valve 116. The valve rod 123 projects into the inner chamber 110 and has a distal end on which a closure valve 124 is pivotally mounted for closing the outlet port 112. When the servo piston 122 is moved to the left until the closure valve 124 is held closely against the distribution member 46, the outlet port 112 is closed. The outlet port 112 is closed when the motor swash plate 73 is vertically positioned (as viewed in FIG. 2) for the transmission ratio of 1. With the outlet port 112 closed, the pump plungers 6 are hydraulically locked to cause the pump cylinder 4 to mechanically drive the motor cylinder 8 through the pump plungers 6 and the pump swash plate 32. As a result, the thrust of the motor plungers 10 on the motor swash plate 63 is eliminated, and so is the load on the various bearings.

The fixed shaft 108 and the support plate 107 have an oil passage 139 communicating with the inner chamber 110 and an oil passage 140 communicating with the outer chamber 111. The support plate 107 has an oil passage 141 communicating with the oil passage 90 connected to the servomotor 81. A changeover valve 142 is disposed in the support plate 107 for selectively communicating the oil passages 139, 140 with the oil passage 141. The changeover valve 142 operates to communicate one of the oil passages 139, 140 which is of a higher oil pressure, with the oil passage 141. Therefore, the servomotor 81 for tilting the motor swash plate 63 of the hydraulic motor M is supplied with the higher oil pressure from the inner chamber 110 or the outer chamber 111.

The pilot valves 88, 120 of the respective servomotors 81, 121 are coupled to ends of links 127, 128, respectively. The other end of the link 127 is coupled to a rotatable shaft 129 which can be rotated about its own axis by an actuator (not shown), the shaft 129 having a cam 130 supported thereon. The other end of the link 128 supports thereon a cam follower 131 slidingly contacting the cam 130. When the servomotor 81 is operated to vertically position the motor swash plate 63, the servomotor 121 is operated by the link 127, the cam 130, the cam follower 131, and the link 128 to enable the closure valve 124 to close the outlet port 112.

A replenishing pump F is mounted on an outer surface of the end wall of the case member 1a. The replenishing pump F is driven by the input shaft 2 for feeding working oil from the oil tank on the bottom of the transmission case 1 and supplying the working oil to the closed hydraulic circuit C through a replenishing oil passage 137 defined in the input shaft 2 and a check valve 138.

Figure 3:
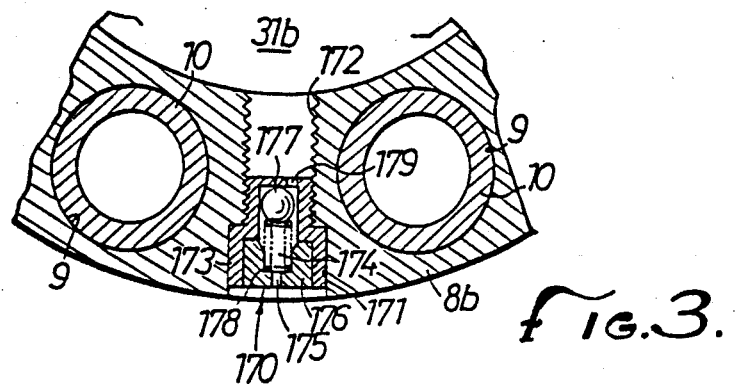
FIG. 3 is an enlarged cross-sectional view taken along line III—III of FIG. 1.

As shown in FIG. 3, the second member 8b of the motor cylinder 8 has three circumferentially equally spaced discharge valves 170 for discharging oil in the second chamber 31b into the oil tank on the bottom of the transmission case 1 when the pressure of such oil is lowered. More specifically, the second member 8b has radially outer larger-diameter holes 171 defined therein respectively at three circumferentially equally spaced positions and radially inner smaller-diameter threaded holes 172 smaller in diameter than and coaxially communicating with the larger-diameter holes 171. The discharge valves 170 are mounted respectively in the larger-diameter holes 171 and the threaded holes 172.

Each of the discharge valves 170 comprises a bottomed cylindrical holder 173 having a closed end directed toward the second chamber 31b and threaded in the threaded hole 172, a closure member 176 closing the open end of the holder 173, defining a valve chamber 174 between itself and the holder 173, and having a valve hole 175, a spherical valve body 177 disposed in the valve chamber 174, and a spring 178 housed in the valve chamber 174 for normally urging the valve body 177 in an opened direction. The holder 173 has a smaller-diameter portion threaded in the threaded hole 172 and a larger-diameter portion joined coaxially to the smaller-diameter portion and fitted in the larger-diameter hole 171. The holder 173 has a communication hole 179 defined in the closed end thereof and communicating the valve chamber 174 with the second chamber 31b. The valve body 177 is of such a diameter that there is a small gap or clearance present between itself and an inner surface of the holder 173. When the valve hole 175 is not closed by the valve body 177, the communication hole 179 and the valve hole 175 are held in communication with each other.

The discharge valve 170 is closed when the oil pressure in the second chamber 31b is higher than a preset pressure level which is determined by the spring 178. When the oil pressure in the second chamber 31b is lower than the preset pressure level, the discharge valve 170 is opened to discharge the oil from the second chamber 31b into the oil tank on the bottom of the transmission case 1.

Figure 4:
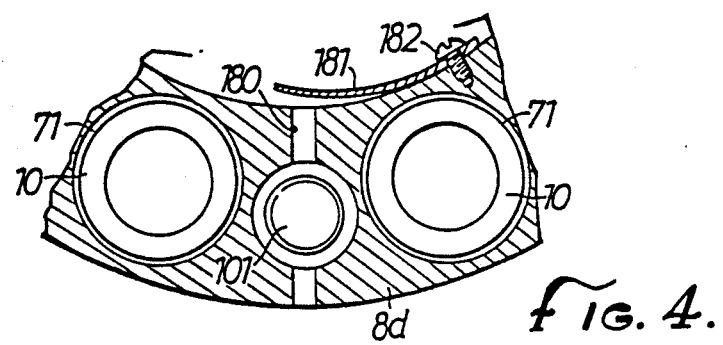
FIG. 4 is an enlarged cross-sectional view taken along line IV—IV of FIG. 1.

As illustrated in FIG. 4, the fourth member 8d of the motor cylinder 8 which defines the outer chamber 111 that forms part of the oil passage interconnecting the inlet of the hydraulic pump P and the outlet of the hydraulic motor M, has a plurality of (three, for example) circumferentially equally spaced discharge holes 180 defined therein for communicating the outer chamber 111 with the oil tank on the bottom of the transmission case 1. A control valve 181 is fixed to the inner surface of the fourth member 8d for selectively opening and closing the end of each of the discharge holes 180 which opens into the outer chamber 111.

The control valve 181 is in the form of a leaf made of a resilient material and has one end fixed to the inner surface of the fourth member 8d by means of a screw 182. The other end of the control valve 181 is resiliently biased in a direction away from the open end of the discharge hole 180, and operates dependent on the pressure difference between the oil pressure in the outer chamber 111 and the oil pressure between the control valve 181 and the open end of the discharge hole 180. When the oil pressure in the outer chamber 111 is reduced to the extent that the pressure difference is lower than a preset pressure level, the control valve 181 is opened to discharge oil from the outer chamber 111 through the discharge hole 180. Thus, working oil is discharged from the hydraulic pump P when the pressure of oil in the inlet port 113 of the hydraulic pump P is below a prescribed pressure level.

Referring back to FIG. 2, the distribution member 46 has defined therein an oil passage 151 leading to the replenishing oil passage 137 and an oil passage 152 leading to the second chamber 31b, with a relief valve 150 disposed between the oil passages 151, 152. When the oil pressure in the replenishing oil passage 137 becomes higher than a preset pressure level, the relief valve 150 is opened to introduce oil released from the replenishing oil passage 137 into the chamber 31.

Operation of the hydraulically operated continuously variable transmission thus constructed is as follows:

During normal operation of the hydraulically operated continuously variable transmission CVT, the chamber 31 is filled up with oil leaked from between the sliding surfaces of the hydraulic pump P and oil released from the relief valve 150. Since oil is continuously supplied to the chamber 31, the oil pressure in the chamber 31 is higher than the pressure level set for the discharge valves 170, which therefore remain closed. Upon acceleration, an amount of oil which corresponds to the amount of oil leaked from the closed hydraulic circuit C is supplied through the check valve 138. The pressure difference across the control valves 181 in the outer chamber 111 is thus greater than the prescribed pressure level, thereby closing the control valves 181. Upon deceleration, high-pressure oil discharged from the hydraulic motor M acting as a pump is supplied to the outer chamber 111. Accordingly, the oil pressure in the outer chamber 111 is high enough to close the control valves 181. When the motor vehicle is either accelerated or decelerated, therefore, the oil pressure in the outer chamber 111 is high and the control valves 181 are closed.

When the engine is stopped, substantially no working oil leaks from between the sliding surfaces of the hydraulic pump P, and the replenishing pump F is also stopped. Therefore, no oil is supplied to the chamber 31 via the relief valve 150. The oil pressure in the second chamber 31b is lower than the pressure level set for the discharge valves 170, which are then opened to discharge the oil from the chamber 31 into the oil tank on the bottom of the transmission case 1. Inasmuch as there are three circumferentially equally spaced discharge valves 170, the oil can efficiently be discharged from at least one of the discharge valves 170 while drawing in air from at least one of the discharge valves 170 no matter how the motor cylinder 8 may be angularly positioned at the time the engine is stopped.

Because no oil pressure is introduced into the outer chamber 111 at the time of engine shutdown the pressure difference across the control valves 181 is lower than the prescribed pressure level therefor. The control valves 181 are thus open to discharge the oil from the outer chamber 111 into the oil tank. The oil discharge can efficiently be effected since there are three circumferentially equally spaced control valves 181.

When starting the engine, any resistance which would otherwise be produced by the plungers 6 and the connecting rods 44 stirring the oil in the chamber 31 is not generated since the oil has been discharged from the chamber 31 during engine shutdown. Consequently, such resistance is not produced even when the viscosity of the oil is increased at low temperature.

The oil is sufficiently discharged from the outer chamber 111 when the engine is stopped. Therefore, resistance to the drawing of oil at the instant the hydraulic pump P coupled to the engine is started is small. Even if the oil viscosity is increased at low temperature, instantaneous resistance to the drawing of oil right after the engine is started is small.

Accordingly, the engine can smoothly be started at low temperature without increasing the initial power input from an engine starter. The continuously variable transmission operates in the same manner as heretofore during normal operation mode.

With the present invention, as described above, the control valves 181 coupled to the inlet of the chamber 31 are openable to discharge working oil from the chamber 31 when the oil pressure at the inlet of the chamber 31 is lowered below the prescribed pressure level. Therefore, while employing the closed hydraulic circuit, resistance to the drawing of oil by the hydraulic pump P is reduced and so is the load on the input shaft 2 when the input shaft 2 is started.

Figure 5:
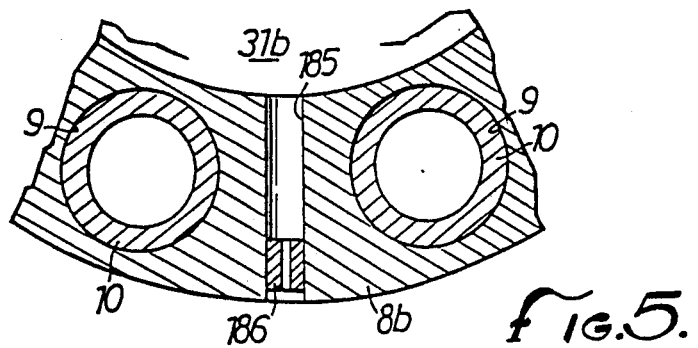
FIG. 5 is a cross-sectional view of a restriction according to another embodiment of the present invention.

FIG. 5 shows another embodiment of the present invention The second member 8b of the motor cylinder 8 has three circumferentially equally spaced discharge holes 185 defined radially therein and providing communication between the second chamber 31b and the oil tank on the bottom of the transmission case 1. Oil discharge means comprising restrictions 186 are fitted and fixedly mounted respectively in the discharge holes 185. The restrictions 186 are designed such that while the hydraulic pump P is in operation, the chamber 31 is filled with working oil that has leaked into the chamber 31. The embodiment shown in FIG. 5 is also effective in reducing the resistance which would be produced by the plungers 6 and the connecting rods 44 stirring the oil in the chamber 31 at the time of starting the engine.

Figure 6:
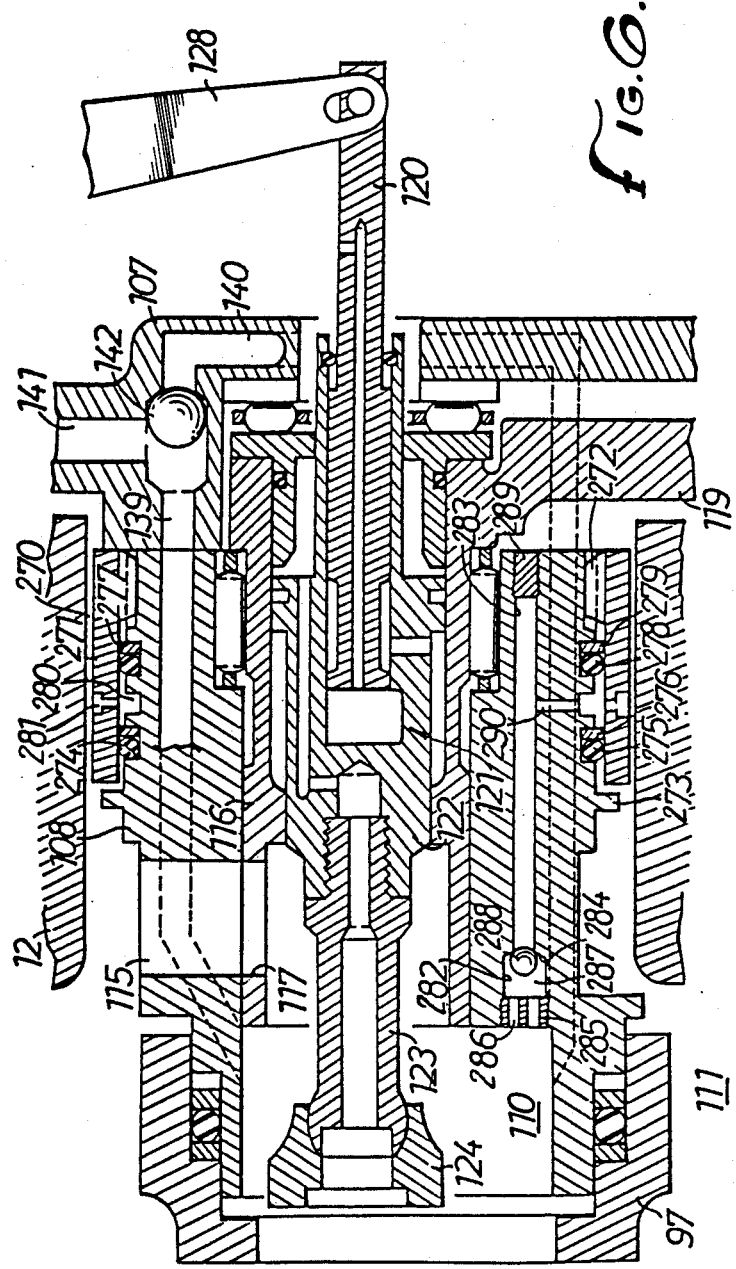
FIG. 6 is an enlarged fragmentary cross-sectional view of a hydraulically operated continuously variable transmission according to still another embodiment of the present invention.

FIG. 6 fragmentarily illustrates a hydraulically operated continuously variable transmission according to still another embodiment of the present invention. A basically cylindrical seal member 271 is fitted over the fixed shaft 108, with a small gap or clearance 270 being defined between the inner peripheral surface of the support shaft 12 and the outer peripheral surface of the seal member 271. The seal member 271 is coupled to the outer surface of the fixed shaft 108 by means of splines 272 having a play in the radial direction of the fixed shaft 108 so that the seal member 271 will float to keep the small gap 270 annular in shape regardless of small positional deviation or misalignment between the fixed shaft 108 and the support shaft 12. In order to prevent the seal member 271 from being axially moved, a stop flange 273 projects radially outwardly from and extends fully circumferentially over the fixed shaft 108 in axially confronting relation to one end of the seal member 271. The other end of the seal member 271 is borne by the support plate 107.

A groove 274 is defined fully circumferentially in the outer surface of the fixed shaft 108 axially between the stop flange 273 and the splines 272 and closely to the stop flange 273. In the groove 274, there are fitted an O-ring 275 and a backup ring 276 which are held in sliding contact with the inner surface of the seal member 271. Another groove 277 is defined fully circumferentially in the outer surface of the fixed shaft 108 axially closely to the splines 272. In the groove 277, there are fitted an O-ring 278 and a backup ring 279 which are held in sliding contact with the inner surface of the seal member 271.

An annular chamber 280 is defined axially between the grooves 274, 277 and radially between the seal member 271 and the fixed shaft 108. The seal member 271 has a plurality of communication holes 281 defined therein and communicating the annular chamber 280 with the gap 270.

The clutch valve 116 has a larger-diameter hole 282 defined therein near the inner chamber 110 and an outer smaller-diameter hole 283 defined therein and communicating coaxially with the larger-diameter hole 282 through a tapered seal surface 284 which progressively becomes larger in diameter toward the larger-diameter hole 282, the holes 282, 283 extending parallel to the axis of the clutch valve 116. The end of the larger-diameter hole 282 close to the inner chamber 110 is closed off by a closure member 286 having holes 285. Between the closure member 286 and the tapered seal surface 284, there is defined a valve chamber 287 housing therein a spherical valve body 288 which can be seated on the tapered seal surface 284. The smaller-diameter hole 283 has an outer end closed off by a cap 289 and is held in communication with the annular chamber 280 through an oil hole 290 defined in the clutch valve 116.

Therefore, the small gap 270 between the fixed shaft 108 and the support shaft 12 is held in communication with the inner chamber 110 through the communication holes 281, the annular chamber 280, the oil hole 290, the smaller-diameter hole 283, the valve chamber 287, and the holes 285. The valve body 288 in the valve chamber 287 allows working oil to flow only in a direction from the small gap 270 into the inner chamber 110.

The arrangement shown in FIG. 6 operates as follows: When the motor vehicle decelerates, the hydraulic motor M operates as a pump to discharge high-pressure oil into the outer chamber 111. With the oil temperature being relatively low, the small gap 270 between the support shaft 12 and the fixed shaft 108 provides a sufficient seal, and the durability problem of a contact seal which would otherwise be required is eliminated.

When the oil temperature increases, the viscosity of the working oil decreases, and the high-pressure oil in the outer chamber 111 tends to leak out of the small gap 270. However, since the oil pressure in the inner chamber 110 is lower, the valve body 288 in the valve chamber 287 is unseated off the tapered seal surface 284, permitting the high-pressure oil that has flowed into the small gap 270 to be introduced into the inner chamber 110 via the communication holes 281, the annular chamber 280, the oil hole 290, the smaller-diameter hole 283, the valve chamber 287, and the holes 285. Therefore, even if the amount of oil which has flowed into the gap 270 is in excess of the amount of oil discharged from the replenishing pump F, most of the oil, e.g., 50% thereof, is introduced into the inner chamber 110. Accordingly, the hydraulic motor M is not subject to oil shortage, and does not produce noise.

Upon acceleration of the motor vehicle, high-pressure oil is discharged from the hydraulic pump P into the inner chamber 110. At this time, the valve body 288 is forcibly seated on the tapered seal surface 184 by the oil that is introduced into the valve chamber 187 through the holes 285, thus cutting off the gap 270 from the inner chamber 110. Consequently, when the motor vehicle is accelerated, no high-pressure oil leaks out through the gap 270, or is supplied to the outer chamber 111.

Although certain preferred embodiments have been shown and described, it should be understood that many changes and modifications may be made therein without departing from the scope of the appended claims.

What is claimed is:

1. An oil control apparatus in a hydraulically operated continuously variable transmission of the type having a hydraulic pump connected to a hydraulic motor by a closed hydraulic circuit, comprising, control valve means coupled to the closed hydraulic circuit on an inlet side of said hydraulic pump and openable for discharging working oil from said closed hydraulic circuit and said hydraulic pump to the outside of said closed hydraulic circuit when the pressure of oil in said closed hydraulic circuit on said inlet side of the hydraulic pump is below a prescribed pressure level, wherein said control valve means is disposed in a motor cylinder of said hydraulic motor, said motor cylinder being rotatable about an axis, and said control valve means operates to discharge a substantial proportion of said working oil when said pressure is below said prescribed level regardless of the rotational position of said motor cylinder.

2. A hydraulically operated continuously variable transmission comprising:
an input shaft;
a hydraulic pump coupled to said input shaft;
an output shaft;
a hydraulic motor coupled to said output shaft;
a closed hydraulic circuit interconnecting said hydraulic pump and said hydraulic motor; and
control valve means coupled to the closed hydraulic circuit on an inlet side of said hydraulic pump and openable for discharging working oil from said closed hydraulic circuit to the outside of said closed hydraulic circuit when the pressure of oil in said closed hydraulic circuit on said inlet side of the hydraulic pump is below a prescribed pressure level;
wherein said hydraulic motor has a motor cylinder, said control valve means comprising three circumferentially equally spaced control valves disposed in said motor cylinder and three circumferentially equally spaced discharge holes defined in said motor cylinder and openably closed by said control valves, respectively.

3. A hydraulically operated continuously variable transmission comprising:
an input shaft;
a hydraulic pump coupled to said input shaft;
an output shaft;
a hydraulic motor coupled to said output shaft;
a closed hydraulic circuit interconnecting said hydraulic pump and said hydraulic motor; and
control valve means coupled to the closed hydraulic circuit on an inlet side of said hydraulic pump and openable for discharging working oil from said closed hydraulic circuit to the outside of said closed hydraulic circuit when the pressure of oil in said closed hydraulic circuit on said inlet side of the hydraulic pump is below a prescribed pressure level;
wherein said hydraulic motor has a motor cylinder, said control valve means comprising three circumferentially equally spaced control valves disposed in said motor cylinder and three circumferentially equally spaced discharge holes defined in said motor cylinder and openably closed by said control valves, respectively;
wherein said control valves comprise resilient leaf members having ends fixed to said motor cylinder and opposite ends resiliently urged to move away from open ends of said discharge holes.

4. A hydraulically operated continuously variable transmission comprising:
an input shaft;
a hydraulic pump coupled to said input shaft and having a pump swash plate and a pump cylinder supporting an annular array of slidable pump plungers held in slidable contact with said pump swash plate;
an output shaft;
a hydraulic motor coupled to said output shaft and having a motor swash plate and a motor cylinder supporting an annular array of slidable motor plungers held in slidable contact with said motor swash plate, said pump cylinder being surrounded by said motor cylinder with a hydraulically hermetic chamber defined therebetween and accommodating therein said pump swash plate and said pump plungers;
a closed hydraulic circuit interconnecting said hydraulic pump and said hydraulic motor; and
oil discharge means disposed in said motor cylinder for discharging oil from said hydraulically hermetic chamber when the pressure of oil in said hydraulically hermetic chamber is below a prescribed pressure level.

5. A hydraulically operated continuously variable transmission according to claim 4, wherein said oil discharge means comprises three circumferentially equally spaced discharge holes defined in said motor cylinder and three circumferentially equally spaced discharge valves disposed respectively in said discharge holes.

6. A hydraulically operated continuously variable transmission according to claim 5, wherein said discharge valves comprise spring-biased valves, respectively.

7. A hydraulically operated continuously variable transmission according to claim 4, wherein said oil discharge means comprises three circumferentially equally spaced discharge holes defined in said motor cylinder and three circumferentially equally spaced restrictions disposed respectively in said discharge holes.

8. A hydraulically operated continuously variable transmission according to claim 4, wherein said motor cylinder rotates about an axis, and said oil discharge means operates to discharge a substantial proportion of said oil when said oil pressure in said hydraulically hermetic chamber is below said prescribed pressure level regardless of the rotational position of said motor cylinder.

9. A hydraulically operated continuously variable transmission comprising:
an input shaft;
a hydraulic pump coupled to said input shaft;
an output shaft;
a hydraulic motor coupled to said output shaft;
a closed hydraulic circuit interconnecting said hydraulic pump and said hydraulic motor; and
control valve means coupled to the closed hydraulic circuit on an inlet side of said hydraulic pump and openable for discharging working oil from said closed hydraulic circuit to a casing of said transmission when the pressure of oil in said closed hydraulic circuit on said inlet side of the hydraulic pump is below a prescribed pressure level, wherein said hydraulic motor has a motor cylinder, said control valve means comprising three circumferentially equally spaced control valves disposed in said motor cylinder and three circumferentially equally spaced discharge holes defined in said motor cylinder and openably closed by said control valves, respectively.

10. A hydraulically operated continuously variable transmission according to claim 9, wherein said control valves comprise resilient leaf members having ends fixed to said motor cylinder and opposite ends resiliently urged to move away from open ends of said discharge holes.

11. An oil control apparatus in a hydraulically operated continuously variable transmission of the type having a hydraulic pump connected to a hydraulic motor by a closed hydraulic circuit, comprising, control valve means coupled to the closed hydraulic circuit on an inlet side of said hydraulic pump and openable for discharging working oil from said closed hydraulic circuit to the outside of said closed hydraulic circuit when the pressure of oil in said closed hydraulic circuit on said inlet side of the hydraulic pump is below a prescribed pressure level, wherein said control valve means comprises at least three circumferentially equally spaced control valves disposed in a motor cylinder of said hydraulic motor and three circumferentially equally spaced discharge holes defined in motor cylinder and openably closed by said valves, respectively.

12. An oil control apparatus in a hydraulically operated continuously variable transmission of the type having a hydraulic pump connected to a hydraulic motor by a closed hydraulic circuit, comprising, control valve means coupled to the closed hydraulic circuit on an inlet side of said hydraulic pump and openable for discharging working oil from said closed hydraulic circuit to the outside of said closed hydraulic circuit when the pressure of oil in said closed hydraulic circuit on said inlet side of the hydraulic pump is below a prescribed pressure level, wherein said control valve means comprises a resilient leaf member having an end fixed to a motor cylinder of said hydraulic motor and an opposite end resiliently urged to move away from an open end of a discharge hole defined in said motor cylinder, said discharge hole being openably closed by said control valve means.

13. An oil control apparatus in a hydraulically operated continuously variable transmission of the type having a hydraulic pump connected to a hydraulic motor by a closed hydraulic circuit, comprising, control valve means coupled to the closed hydraulic circuit on an inlet side of said hydraulic pump and openable for discharging working oil from said closed hydraulic circuit to the outside of said closed hydraulic circuit when the pressure of oil in said closed hydraulic circuit on said inlet side of the hydraulic pump is below a prescribed pressure level, wherein said control valve means is disposed in a motor cylinder of said hydraulic motor and a discharge hole is defined in said motor cylinder, said discharge hole being openably closed by said control valve means.

14. An oil discharge apparatus in a hydraulically operated continuously variable transmission of the type having a hydraulic pump and a hydraulic motor interconnected by a closed hydraulic circuit, said hydraulic pump having pump plungers disposed in a pump cylinder and said hydraulic motor having motor plungers disposed in a motor cylinder, one of said pump cylinder and said motor cylinder surrounding the other of said pump cylinder and said motor cylinder with a hydraulically hermetic chamber defined therebetween, comprising, oil discharge means disposed in said one of said pump cylinder and said motor cylinder for discharging oil from said hydraulically hermetic chamber when the pressure of oil in said hydraulically hermetic chamber is below a prescribed pressure level.

15. An oil discharge apparatus according to claim 14, wherein said oil discharge means comprises at least one discharge hole defined in said one of said pump cylinder and said motor cylinder and a discharge valve disposed in said discharge hole.

16. An oil discharge apparatus according to claim 15, wherein said discharge valve comprises a spring-biased valve.

17. An oil discharge apparatus according to claim 14, wherein said discharge means comprises at least one discharge hole defined in said one of said pump cylinder and said motor cylinder and a restriction disposed in said discharge hole.

18. An oil discharge apparatus according to claim 14, wherein said one of said pump cylinder and said motor cylinder rotates about an axis, and said oil discharge means operates to discharge a substantial proportion of said oil when said oil pressure in said hydraulically hermetic chamber is below said prescribed pressure level regardless of the rotational position of said one of said pump cylinder and said motor cylinder.

19. An oil discharge apparatus in a hydraulically operated continuously variable transmission of the type having a hydraulic pump and a hydraulic motor interconnected by a closed hydraulic circuit, said hydraulic pump having pump plungers disposed in a pump cylinder and said hydraulic motor having motor plungers disposed in a motor cylinder, said motor cylinder surrounding said pump cylinder with a hydraulically hermetic chamber defined therebetween, comprising, oil discharge means disposed in said motor cylinder for discharging oil from said hydraulically hermetic chamber when the pressure of oil in said hydraulically hermetic chamber is below a prescribed pressure level.

20. An oil discharge apparatus according to claim 19, wherein said oil discharge means comprises at least one discharge hole defined in said motor cylinder and a discharge valve disposed in said discharge hole.

21. An oil discharge apparatus according to claim 20, wherein said discharge valve comprises a spring-biased valve.

22. An oil discharge apparatus according to claim 19, wherein said discharge means comprises at least one discharge hole defined in said motor cylinder and a restriction disposed in said discharge hole.

23. An oil discharge apparatus according to claim 19, wherein said motor cylinder rotates about an axis, and said oil discharge means operates to discharge a substantial proportion of said oil when said oil pressure in said hydraulically hermetic chamber is below said prescribed pressure level regardless of the rotational position of said motor cylinder.

* * * * *